US012573714B2

(12) United States Patent
Li et al.

(10) Patent No.: US 12,573,714 B2
(45) Date of Patent: Mar. 10, 2026

(54) COMPOSITE DIAPHRAGMS FOR ZINC SECONDARY BATTERIES AND ZINC SECONDARY BATTERIES

(71) Applicants:HENAN CHAOLI NEW ENERGY CO., LTD., Xinxiang (CN); CHAOWEI POWER GROUP CO., LTD., Huzhou (CN)

(72) Inventors: Liangsheng Li, Xinxiang (CN); Mingyu Wang, Xinxiang (CN); Liangdong Zhao, Xinxiang (CN)

(73) Assignees: HENAN CHAOLI NEW ENERGY CO., LTD., Xinxiang (CN); CHAOWEI POWER GROUP CO., LTD., Huzhou (CN)

( * ) Notice: Subject to any disclaimer, the term of this patent is extended or adjusted under 35 U.S.C. 154(b) by 0 days.

(21) Appl. No.: 19/004,350

(22) Filed: Dec. 29, 2024

(65) Prior Publication Data

US 2025/0141043 A1 May 1, 2025

Related U.S. Application Data

(63) Continuation of application No. PCT/CN2023/087913, filed on Apr. 12, 2023.

(30) Foreign Application Priority Data

Jun. 29, 2022 (CN) .......................... 202210754431.1

(51) Int. Cl.
H01M 50/431 (2021.01)
H01B 1/24 (2006.01)
(Continued)

(52) U.S. Cl.
CPC ....... H01M 50/431 (2021.01); H01M 10/286 (2013.01); H01M 50/417 (2021.01); *H01B 1/24* (2013.01)

(58) Field of Classification Search
CPC ............. H01M 50/431; H01M 50/446; H01M 50/449; H01M 50/541; H01M 50/46; H01M 50/461; H01M 50/469
See application file for complete search history.

(56) References Cited

U.S. PATENT DOCUMENTS

2006/0008700 A1    1/2006   Yong et al.

FOREIGN PATENT DOCUMENTS

CN          109786667 A       5/2019
CN          110098365 A       8/2019
(Continued)

OTHER PUBLICATIONS

International Search Report in PCT/CN2023/087913 mailed on Jun. 5, 2023, 6 pages.
(Continued)

*Primary Examiner* — Stephan J Essex
(74) *Attorney, Agent, or Firm* — JEEN IP LAW, LLC

(57) ABSTRACT

The composite diaphragm for a zinc secondary battery, including: a base diaphragm and a conductive film for the zinc secondary battery, the conductive film being connected to one end of the base diaphragm. The conductive film includes a porous polymer film, and pores of the porous polymer film are filled with conductive compositions, the conductive compositions including 1-10 parts by weight of a conductive agent and 0.1-1 part by weight of an additive. The conductive agent includes at least one of graphite, conductive carbon black, acetylene black, or a graphene carbon nanotube; and the additive includes at least one of a tin powder, a tin dioxide powder, a bismuth powder, a bismuth oxide powder, an indium powder, an indium oxide powder, a lead powder, a lead oxide powder, a cadmium powder, or a cadmium oxide powder.

17 Claims, 6 Drawing Sheets

(51) Int. Cl.
  *H01M 10/28*    (2006.01)
  *H01M 50/417*   (2021.01)

(56)       References Cited

FOREIGN PATENT DOCUMENTS

| | | | |
|---|---|---|---|
| CN | 110364660 A | 10/2019 | |
| CN | 110600746 A | 12/2019 | |
| CN | 110854345 A | 2/2020 | |
| CN | 110911724 A | 3/2020 | |
| CN | 113422158 A * | 9/2021 | ........... H01M 10/30 |
| CN | 113422158 B | 10/2021 | |
| CN | 214477788 U * | 10/2021 | |
| CN | 114614076 A | 6/2022 | |
| CN | 114974669 A | 8/2022 | |
| JP | 2006156337 A | 6/2006 | |
| JP | 2019216059 A | 12/2019 | |
| KR | 20070019837 A | 2/2007 | |

OTHER PUBLICATIONS

Written Opinion in PCT/CN2023/087913 mailed on Jun. 5, 2023, 6 pages.
The Decision of Grant in Russian Application No. 2025101632/07(003915) mailed on Jul. 1, 2025, 14 pages.

* cited by examiner

4

3

2

4    3    2

A 5    2

5

2

A

00

01

B

COMPOSITE DIAPHRAGMS FOR ZINC SECONDARY BATTERIES AND ZINC SECONDARY BATTERIES

CROSS REFERENCE TO RELATED APPLICATIONS

This application is a continuation of International Application No. PCT/CN2023/087913, filed on Apr. 12, 2023, which claims priority of Chinese Patent Application No. 202210754431.1, filed on Jun. 29, 2022, the entire contents of which are incorporated herein by reference.

TECHNICAL FIELD

The present disclosure relates to the field of battery technology, and specifically relates to zinc secondary batteries and preparation methods thereof, composite diaphragms for zinc secondary batteries and zinc secondary batteries.

BACKGROUND

Zinc is an excellent material for batteries, and there are many types of batteries developed based on the zinc, such as, zinc-nickel secondary batteries, zinc-manganese secondary batteries, zinc-ion secondary batteries, etc. Each of the aforementioned zinc secondary batteries has a following problem that when charging, the zinc constituting a negative electrode generates a dendritic crystal, which punctures a diaphragm or reacts with a shell metal of the battery.

In addition, a direct contact between the negative electrode of an electric core and the metal shell also causes a reaction, which generates a great amount of gas or results in corrosion of the metal shell. To prevent the negative electrode from reacting with the metal shell, a layer of metal is wrapped around an outside of the electric core. This not only serves as a conductor, but also prevents the negative electrode from reacting with the metal shell. For example, Chinese Utility Model Patent CN214477788U discloses a composite diaphragm for wound battery, including a diaphragm. One end of the diaphragm is bonded with an adhesive tape, the adhesive tape includes a diaphragm bonding portion, an isolation portion, and a conductive bonding portion, which are sequentially arranged along a length direction of the adhesive tape. The diaphragm bonding portion is bonded with one side of a corresponding end portion of the diaphragm. A conductive foil is bonded on the conductive bonding portion, and the conductive foil is one of a metal foil, a graphite film, or a graphene film. The isolation portion is used to bond with a surface of a corresponding electrode sheet. However, the diaphragm is a polymer film, and the conductive foil on the composite diaphragm is less compatible with the diaphragm. Therefore, a connection effect between the conductive foil and the diaphragm is not strong.

SUMMARY

To improve a connection effect between an outer conductor of an electric core and a polymer film, the present disclosure provides a zinc secondary battery and a preparation method thereof, a composite diaphragm for a zinc secondary battery, and a zinc secondary battery.

One of the embodiments of the present disclosure provides a conductive film for a zinc secondary battery, including a porous polymer film, and pores of the porous polymer film are filled with conductive compositions, the conductive compositions including 1-10 parts by weight of a conductive agent and 0.1-1 part by weight of an additive. The conductive agent includes at least one of graphite, conductive carbon black, acetylene black, or a graphene carbon nanotube; and the additive includes at least one of a tin powder, a tin dioxide powder, a bismuth powder, a bismuth oxide powder, an indium powder, an indium oxide powder, a lead powder, a lead oxide powder, a cadmium powder, or a cadmium oxide powder.

One of the embodiments of the present disclosure provides a zinc secondary battery including an electric core and the composite diaphragm for a zinc secondary battery wrapped around a periphery of the electric core.

One of the embodiments of the present disclosure provides a zinc secondary battery includes a shell and an electric core disposed in the shell. An inner wall of the shell is fitted with the above composite diaphragm for a zinc secondary battery.

BRIEF DESCRIPTION OF THE DRAWINGS

The present disclosure is further illustrated by way of exemplary embodiments, which are described in detail by means of the accompanying drawings. These embodiments are not limiting, and in these embodiments the same numbering indicates the same structure, wherein.

DETAILED DESCRIPTION

The technical solutions of the present disclosure are described in detail below in connection with specific embodiments. In the following embodiments, ingredients used are commercially available commodities, unless otherwise specified.

Figure 1:
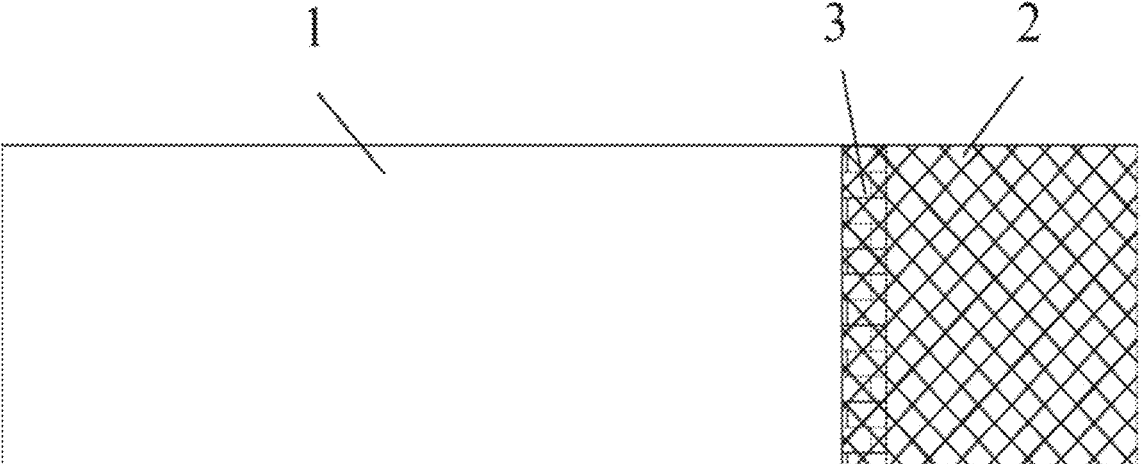
FIG. 1 is a schematic diagram illustrating a structure of a composite diaphragm for a zinc secondary battery according to some embodiments of the present disclosure.

FIG. 1 is a schematic diagram illustrating a structure of a composite diaphragm for a zinc secondary battery according to some embodiments of the present disclosure.

In some embodiments, as shown in FIG. 1, a composite diaphragm for a zinc secondary battery includes a base diaphragm 1 and a conductive film 2 for the zinc secondary battery connected to one end of the base diaphragm 1. One end of the conductive film 2 for the zinc secondary battery and one end of the base diaphragm 1 are laminated and melt-welded to form a welding portion 3.

The zinc secondary battery refers to a rechargeable battery using a zinc metal as a negative electrode material. The zinc secondary battery is capable of repeatedly storing and releasing electrical energy through electrochemical reactions during charging and discharging processes.

In some embodiments, during the discharging process of the zinc secondary battery, the zinc metal oxidizes to zinc ions and releases electrons. During the charging process, the zinc ions are reduced to the zinc metal on an electrode and absorb the electrons, thus realizing an effective storage and release of the electrical energy.

More descriptions regarding the zinc secondary battery may be found in FIGS. 2-7 and relevant descriptions thereof.

The composite diaphragm for the zinc secondary battery refers to a battery diaphragm composed of two or more different materials. The composite diaphragm for the zinc secondary battery can improve a conductivity performance, a safety performance, etc., of the zinc secondary battery by combining properties of the composed materials.

In some embodiments, the composite diaphragm for the zinc secondary battery is placed between positive and negative electrodes of the zinc secondary battery to isolate the electrons and allow ions to pass through, thereby preventing short circuits and maintaining an electrical neutrality within the zinc secondary battery. In addition, a mechanical support is further provided for the zinc secondary battery to maintain an electrode spacing, improving the safety performance of the zinc secondary battery. During an assembly process, the composite diaphragm for the zinc secondary battery is in a close contact with the electrode. After injecting an electrolyte, the composite diaphragm for the zinc secondary battery plays a key function during the charging and discharging processes of the zinc secondary battery to ensure a stable operation of the zinc secondary battery.

The lamination refers to a process of combining two and/or more layers of materials through a mechanical pressure. In some embodiments, by laminating one end of the base diaphragm 1 with one end of the conductive film 2 for the zinc secondary battery, a close contact and an effective bonding between the two is achieved.

The conductive film 2 for the zinc secondary battery is connected to the base diaphragm 1 through a hot melt welding or an ultrasonic welding.

The hot melt welding refers to a welding manner in which a laminated portion of the conductive film 2 for the zinc secondary battery and the base diaphragm 1 is melted by heating, and then a pressure is applied to the melt laminated portion to realize the connection of the conductive film 2 for the zinc secondary battery and the base diaphragm 1. In some embodiments, the hot melt welding includes a hot melt spot welding or a hot melt surface welding.

The ultrasonic welding refers to a welding manner that uses a frictional heat generated by a high frequency vibration to weld the laminated portion of the conductive film 2 for the zinc secondary battery and the base diaphragm 1. In some embodiments, the ultrasonic welding includes an ultrasonic spot welding or an ultrasonic surface welding.

The conductive film 2 for the zinc secondary battery refers to a film used for an electron transfer and an ion transmission to accomplish electrochemical reactions of the battery (e.g., the zinc secondary battery).

In some embodiments, a thickness of the conductive film 2 for the zinc secondary battery is within a range of 0.02 millimeters (mm) to 3.0 mm. In response to that the thickness of the conductive film 2 for the zinc secondary battery is close to 3.0 mm, the conductive film 2 for the zinc secondary battery is used as a conductive plate. In some embodiments, the thickness of the conductive film 2 for the zinc secondary battery is within a range of 0.05 mm to 2.0 mm. For example, the thickness of the conductive film 2 for the zinc secondary battery is 0.05 mm, 0.1 mm, 1.5 mm, 2.0 mm, etc.

In some embodiments, the conductive film 2 for the zinc secondary battery includes a porous polymer film.

The porous polymer film refers to a substance that allows a passage of the ions and restricts a passage of the electrons. For example, the porous polymer film includes any one of a polyvinyl chloride (PVC) film, a polyethylene (PE) film, a polytetrafluoroethylene (PTFE) film, a styrene butadiene rubber (SBR) film, or a cellulose acetate film.

In some embodiments, a surface and/or an interior of the porous polymer film include a large count of tiny pores. The pores refer to microscopic cavities inside the porous polymer film designed to perform specific functions (e.g., the ion transmission and an electronic isolation).

The large count of pores refer to that a density of the pores on the surface and/or the interior of the porous polymer film is high enough to ensure efficient and stable operation of the zinc secondary battery. Merely way of example, the surface and/or the interior of the porous polymer film may include millions to billions of pores per square centimeter.

The tiny pores may characterize that pore sizes of the pores are small enough to allow only the ions to pass through and prevent the electrons from passing through, thus avoiding the short circuit within the zinc secondary battery.

A pore size refers to a diameter of the pore in the porous polymer film. For example, the pore size of the porous polymer film is within a range of 100 nanometers (nm) to 800 nm. In some embodiments, the pore size of the porous polymer film is within a range of 500 nm to 800 nm, so as to ensure a balance between the ion transmission and the electron isolation. For example, the pore size of the porous polymer film is 500 nm, 650 nm, 800 nm, etc.

In some embodiments, the pores of the porous polymer film are filled with conductive compositions.

In some embodiments, a mass ratio of the porous polymer film to the conductive compositions is within a range of 1:0.02 to 1:0.2. For example, the mass ratio of the porous polymer film to the conductive composition is 1:0.02, 1:0.08, 1:0.14, 1:0.2, etc.

The conductive compositions refer to substances used to improve an electron-conducting ability of the electrodes.

In some embodiments, the conductive compositions include 1-10 parts by weight of a conductive agent and 0.1-1 part by weight of an additive.

The conductive agent refers to a substance used to increase a conductivity of the zinc secondary battery. In some embodiments, the conductive agent includes at least one of graphite, conductive carbon black, acetylene black, or a graphene carbon nanotube. For example, the graphite, the conductive carbon black, the acetylene black, the graphene, and the carbon nanotube are mixed in a first preset ratio so as to constitute the conductive agent. The first preset ratio is a default setting by a specialized technician.

The addictive refers to a substance used to improve a performance of the zinc secondary battery (e.g., increase the conductivity of the zinc secondary battery, improve charging and discharging efficiency of the zinc secondary battery, etc.). In some embodiments, the additive in the conductive compositions includes a mixture of a first additive and a second additive in a mass ratio of (1-5):(0.2-3).

In some embodiments, the first additive includes at least one of a tin powder, a bismuth powder, an indium powder, a lead powder, or a cadmium powder. For example, the tin powder, the bismuth powder, the indium powder, lead powder, and the cadmium powder are mixed in a second preset ratio so as to constitute the first additive. The second preset ratio is a default setting by the specialized technician.

In some embodiments, the second additive includes at least one of a tin dioxide powder, a bismuth oxide powder, an indium oxide powder, a lead oxide powder, or a cadmium oxide powder. For example, the tin dioxide powder, the bismuth oxide powder, the indium oxide powder, the lead oxide powder, and the cadmium oxide powder are mixed in a third preset ratio so as to constitute the second additive. The third preset ratio is a default setting by the specialized technician.

In some embodiments, a particle size of the additive is within a range of 10 nm to 500 nm, etc. For example, the particle size of the first additive is within a range of 10 nm to 100 nm, and the particle size of the second additive is within a range of 20 nm to 500 nm. The particle size refers to a diameter of the additive.

In some embodiments, the additive includes at least one of the tin powder, the tin dioxide powder, the bismuth powder, the bismuth oxide powder, the indium powder, the indium oxide powder, the lead powder, the lead oxide powder, the cadmium powder, or the cadmium oxide powder.

In some embodiments, the conductive film 2 for the zinc secondary battery is prepared through following operations.

In operation 1), a conductive paste is generated by mixing evenly the conductive compositions and a solvent. The solvent includes at least one of water, N-methyl-2-pyrrolidone (NMP), ethylene glycol dimethyl ether, diethylene glycol dimethyl ether, a carbonate solvent, or a carboxylic acid ester.

In operation 2), the conductive film 2 for the zinc secondary battery is obtained by scrapping the conductive paste in operation 1) onto a surface of the porous polymer film and drying the conductive paste. Alternatively, the porous polymer film is immersed in the conductive paste in operation 1), and then, the porous polymer film is taken out and dried, so as to obtain the conductive film 2 for the zinc secondary battery.

In some embodiments, the mixing evenly in operation 1) refers to mixing at a speed of 800 revolutions per minute (rpm) to 3000 rpm for 5 minutes (min) to 50 min.

In some embodiments, the speed is within a range of 1000 rpm to 2000 rpm. For example, the speed is 1000 rpm, 1500 rpm, 2000 rpm, etc.

In some embodiments, a mixing time is within a range of 10 min to 30 min. For example, the mixing time is 10 min, 20 min, 30 min, etc.

In some embodiments, a dosage of the solvent is within a range of 10 milliliters (mL) to 100 mL of the solvent for per gram of the conductive agent.

In some embodiments, when the conductive paste is scraped onto the surface of the porous polymer film in operation 2), the porous polymer film is first laid flat on a surface of an impermeable film and/or an impermeable plate. At this time, a surface of the porous polymer film away from the impermeable film and/or the impermeable plate is regarded as a surface A, and a surface of the porous polymer film that is fitted to the impermeable film and/or the impermeable plate is regarded as a surface B.

In some embodiments, the conductive paste is coated on the surface A of the aforementioned porous polymer film, and the surface A coated with the conductive paste is scraped for 0.5 min to 10 min. In some embodiments, a scraping time on the surface A is within a range of 1 min to 3 min. For example, the scraping time on the surface A is 1 min, 2 min, 3 min, etc. A scraping knife or a scraping plate is used for the scraping.

In some embodiments, in response to a completion of the scraping of the surface A of the porous polymeric film, the porous polymeric film is turned over. After the porous polymer film is turned over, the surface A of the porous polymer film is fitted to the impermeable film and/or the impermeable plate, and the surface B is away from the impermeable film and/or the impermeable plate. The conductive paste is then coated on the surface B, and the surface B coated with the conductive paste is scraped for 0.5 min to 10 min. In some embodiments, a scraping time on the surface B is within a range of 1 min to 3 min. For example, the scraping time on the surface B is 1 min, 2 min, 3 min, etc.

In some embodiments, an immersion time of the porous polymer film in operation 2) is within a range of 10 min to 300 min. For example, the immersion time is 10 min, 100 min, 300 min, etc.

In some embodiments of the present disclosure, by setting the scraping time of the surface A and/or the surface B within the range of 0.5 min to 10 min, the conductive paste can be uniformly distributed on the surface A and/or the surface B of the porous polymer film, thereby ensuring conductive properties of the subsequent conductive film 2 for the zinc secondary battery, and avoiding unnecessary time-consumption.

In some embodiments, in operation 2), an immersion time of the porous polymer film in the conductive paste in operation 1) is within a range of 10 min to 300 min. For example, the immersion time is 10 min, 100 min, 300 min, etc.

In some embodiments of the present disclosure, by setting the immersion time within the range of 10 min to 300 min, an absorption rate of the porous polymer film to the conductive paste and a uniformity of the coating can be effectively improved, thereby enhancing the conductive properties of the subsequently obtained conductive film 2 for the zinc secondary battery.

In some embodiments, the conductive film 2 for the zinc secondary battery may also be prepared through a following process. Polymer particles, an antioxidant, the conductive compositions, and a pore-forming agent are mixed evenly. Then, the conductive film 2 for the zinc secondary battery is obtained by performing an extrusion, a curtain coating, a casting, a longitudinal stretching, a transverse stretching, a pore-forming agent removing, a washing treatment on the mixture.

The polymer particles refer to great molecules consisting of a large count of repeating units, which are small granular substances formed by polymerization reactions. For example, the polymer particles include polyethylene particles, polypropylene particles, etc. A molecular weight of the polyethylene or the polypropylene is not less than 1 million.

The antioxidant refers to a substance used to prevent oxidation of the electrode materials or the electrolytes in the zinc secondary battery. For example, the antioxidant includes at least one of tert-butylhydroquinone, or 4,4-thiobis(6-tert-butylresorcinol).

The pore-forming agent refers to a temporary additive used to form the pores. For example, the pore-forming agent includes any one of a white oil, n-heptane, or a paraffin.

In some embodiments, a mass ratio of the polymer particles, the antioxidant, the conductive agent, the additive, and the pore-forming agent is (70-95):(8-10):(5-15):(10-20).

The extrusion may heat a product of homogeneously mixing the polymer particles, the antioxidant, the conductive composition, and the pore-forming agent to a molten state, and form a continuous melt by extruding the melt product through an extruder.

In some embodiments, a temperature at the extrusion is within a range of 180 degrees centigrade (° C.) to 230° C. For example, the temperature at the extrusion is 180° C., 200° C., 230° C., etc.

In some embodiments of the present disclosure, by controlling the temperature at the extrusion, a proper plasticization and an uniform flow of the product after the polymer particles, the antioxidant, the conductive composition, and the pore-forming agent are mixed homogeneously can be ensured.

The curtain coating refers to a process of forming a thin liquid film layer by coating the melt through a slit and/or an orifice to a cooled rotating cast film wheel (or a cast sheet wheel), and subsequently solidifying the liquid film layer to a solid film by cooling.

The casting refers to a process of solidifying the solid film to form a solid thick sheet. In some embodiments, the thick sheet is obtained after the casting. A thickness of the thick sheet is within a range of 400 microns (μm) to 800 μm. For example, the thickness of the thick sheet is 400 μm, 600 μm, 800 μm, etc.

The longitudinal stretching refers to an operation of stretching the thick sheet longitudinally after the casting. For example, the stretching is performed along a length direction of the thick sheet.

In some embodiments, a temperature during the longitudinal stretching is within a range of 100° C. to 120° C. For example, the temperature is 100° C., 110° C., 120° C., etc., during the longitudinal stretching.

In some embodiments of the present disclosure, by controlling the temperature during the longitudinal stretching to be within the range of 100° C. to 120° C., a stretching effect can be optimized, and the conductive properties of the subsequently prepared conductive film 2 for the zinc secondary battery can be improved.

The transverse stretching refers to an operation of stretching the thick sheet laterally after the casting. For example, the stretching is performed in a width direction of the thick sheet.

In some embodiments, the temperature during the transverse stretching is within a range of 110° C. to 125° C. For example, the temperature is 110° C., 115° C., 125° C., etc., during the transverse stretching.

In some embodiments of the present disclosure, by controlling the temperature during the transverse stretching to be within the range of 110° C. to 125° C., a proper fluidity and a stretching effect can be ensured.

In some embodiments, the pore-forming agent helps to form a necessary pore structure in the porous polymer film of the conductive film 2 for the zinc secondary battery during a preparation of the conductive film 2 for the zinc secondary battery. Therefore, when the solid thick sheet is formed based on the product of mixing homogeneously the polymer particles, the antioxidant, the conductive composition, and the pore-forming agent through the operations of the extrusion, the curtain coating, the casting, and the stretching, the pore-forming agent needs to be removed. For example, the pore-forming agent is removed using an dichloromethane extraction. By utilizing the solvent's ability to dissolve the pore-forming agent, the pore-forming agent is removed, leaving the pores in the porous polymer film.

In the embodiments of the present disclosure, by filling the pores of the porous polymer film with the conductive compositions including the conductive agent and the additive, the conductive film for the zinc secondary battery can have a relatively low electrical resistance and a good conductivity, which can reduce an amount of heat generated when an external short-circuit of the battery occurs, thereby improving the conductivity and stability of the zinc secondary battery.

Embodiment 1

In some embodiments, a conductive film for a zinc secondary battery includes a porous polymer film, and the porous polymer film is a porous polypropylene film. Pores of the porous polymer film are filled with conductive compositions. The conductive compositions include following components by weight: a conductive agent 2 grams (g) and an additive 0.1 g. The conductive agent is conductive carbon black, the additive is a tin powder. A particle size of the conductive carbon black is 25 nm, and a particle size of the tin powder is 20 nm. A mass ratio of the porous polymer film (i.e., the porous polypropylene film) to the conductive compositions is 5:1. In some embodiments, a manner of preparing the conductive film for the zinc secondary battery includes following operations.

1) A conductive paste was obtained by mixing the conductive agent, the additive, and a solvent, and stirring evenly the mixture at 1500 rpm. A dosage of the solvent is 20 mL of the solvent per 2 g of the conductive agent. In some embodiments, the solvent is deionized water.

2) One side of the porous polypropylene film was fitted with a first glass plate, and then a side of the porous polypropylene film that is not in contact with the first glass plate was placed facing upward. The conductive paste was coated on the upper surface of the porous polypropylene film, and scraped back and forth for 1 min using a scraper.

A second glass plate was then laminated on an upper surface of the porous polypropylene film, and the porous polypropylene film was turned over to place a side of the second glass plate fitted with the first glass plate facing upward. The first glass plate was uncovered and peeled off. The conductive paste was then coated on the surface of the porous polypropylene film, and scraped back and forth for 1 min using the scraper.

3) The porous polypropylene film after scraping the conductive paste on both sides in operation 2) were placed in a vacuum drying oven together with the second glass plate, and dried at 60° C. for 2 h. After cooled, the porous polypropylene film and the second glass plate were taken out.

As shown in FIG. 1, the composite diaphragm for the zinc secondary battery in the embodiment includes a base diaphragm 1. The base diaphragm is a cellulose acetate film. One end of the base diaphragm 1 is connected to the conductive film 2 for the zinc secondary battery. One end of the conductive film 2 for the zinc secondary battery and one end of the base diaphragm 1 are laminated and melt-welded to form a welding portion 3. A length of the base diaphragm 1 is 120 mm, a length of the conductive film 2 for the zinc secondary battery is 30 mm, a width of each of the base diaphragm 1 and the conductive film 2 for the zinc secondary battery is 42 mm, and a length of the laminated portion of the base diaphragm 1 and the conductive film 2 for the zinc secondary battery is 5 mm.

In some embodiments, the zinc secondary battery is a zinc-nickel battery including a positive electrode sheet, a negative electrode sheet, a diaphragm, and a electrolyte. The positive electrode sheet is a foamed nickel electrode.

In some embodiments, the negative electrode sheet includes a negative electrode collector copper strip and a negative material layer disposed on the negative electrode collector copper strip. The negative electrode material layer includes a negative electrode active substance, the conductive agent, and a binder.

In some embodiments, the negative electrode active substance is a mixture of zinc oxide, calcium zincate, and a zinc powder according to a mass ratio of 60:10:22. The conductive agent is acetylene black. The binder is consisted of carboxymethyl cellulose (CMC), polyvinyl alcohol, and PTFE according to a mass ratio of 2.5:2:30. A mass ratio of the zinc oxide, the calcium zincate, the zinc powder, the acetylene black, the CMC, the polyvinyl alcohol, and the PTFE is 60:10:22:6:0.025:0.02:0.3.

In some embodiments, the electrolyte includes a mixture of a zinc oxide (ZnO)-saturated potassium hydroxide (KOH) solution with a mass concentration of 30% and a lithia (LiOH) solution with a mass concentration of 2%.

In some embodiments, the diaphragm is a special diaphragm for the zinc-nickel battery.

Embodiment 2

In some embodiments, a conductive film for a zinc secondary battery includes a porous polymer film, and the porous polymer film is a porous polypropylene film. Pores of the porous polymer film are filled with conductive compositions. The conductive composition includes following components by weight: a conductive agent 5 g, an additive 0.2 g. The electrically conductive agent is conductive carbon black, the additive is the tin powder, a particle size of the conductive carbon black is 25 nm, and a particle size of the tin powder is 50 nm. A mass ratio of the porous polymer film (i.e., the porous polypropylene film) to the conductive compositions is 5:1.

In some embodiments, a manner of preparing the conductive film for the zinc secondary battery includes following operations:

1) A conductive paste was obtained by mixing the conductive agent, the additive and a solvent and stirring evenly the mixture at 1500 rpm. A dosage of the solvent is 50 mL of solvent for per 5 g of the conductive agent. In some embodiments, the solvent is the deionized water.

2) One side of the porous polypropylene film was fitted with a first glass plate, and then the side of the porous polypropylene film that is not in contact with the first glass plate was placed facing upward. The conductive paste was coated on the upper surface of the porous polypropylene film, and scraped back and forth for 1 min using a scraper.

A second glass plate was then laminated on the upper surface of the porous polypropylene film, and the porous polypropylene film was turned over, to place a side laminated with the first glass plate facing upward. The first glass plate was uncovered and peeled off, and the conductive paste was then coated on the surface of the porous polypropylene film and scraped back and forth for 1 min using the scraper.

3) The porous polypropylene film was placed together with the second glass plate after scraping the paste on both sides in operation 2) in the vacuum drying oven, dried at 60° C. for 2 h, cooled, and removed.

Other contents (e.g., the composition of the zinc secondary batteries, etc.) are the same as in Embodiment 1.

Embodiment 3

A conductive film for a zinc secondary battery includes a porous polymer film, and the porous polymer film is a porous polypropylene film. Pores of the porous polymer film are filled with conductive compositions. The conductive compositions include following components by weight: a conductive agent 10 g, an additive 0.5 g. The conductive agent is conductive carbon black, the additive is a tin powder. A particle size of the conductive carbon black is 25 nm, and a particle size of the tin powder is 50 nm. A mass ratio of the porous polymer film (i.e., the porous polypropylene film) to the conductive compositions is 5:1.

In some embodiments, a manner of preparing the conductive film for the zinc secondary battery includes following operations:

1) A conductive paste was obtained by mixing the conductive agent, the additive, and a solvent, and stirring evenly the mixture at 1500 rpm. A dosage of the solvent is 90 mL of solvent for every 10 g of the conductive agent. In some embodiments, the solvent is the deionized water.

2) One side of the porous polypropylene film was fitted with the first glass plate, and then the side of the porous polypropylene film that is not in contact with the first glass plate was placed facing upward. The conductive paste was coated on the upper surface of the porous polypropylene film, and scraped back and forth for 1 min using a scraper.

A second glass plate was then laminated on an upper surface of the porous polypropylene film, and the porous polypropylene film was turned over, to replace a side of the second glass plate fitted with the first glass plate facing upward. The first glass plate was uncovered and peeled off, and the conductive paste was then coated on the surface of the porous polypropylene film and scraped back and forth for 1 min using the scraper.

3) The porous polypropylene film after scraping the conductive paste on both sides in operation 2) were placed in a vacuum drying oven together with the second glass plate, and dried at 60° C. for 2 h. After cooled, the porous polypropylene film and the second glass plate were taken out.

Other contents (e.g., the composition of zinc secondary batteries, etc.) are the same as in Embodiment 1.

Embodiment 4

In some embodiments, a conductive film for a zinc secondary battery includes a porous polymer film, and the porous polymer film is the porous polypropylene film. Pores of the porous polymer film are filled with conductive compositions. The conductive composition includes following components by weight: a conductive agent 5 g, an additive 0.2 g. The conductive agent is conductive carbon black, the additive is a tin powder. A particle size of the conductive carbon black is 25 nm, and a particle size of the tin powder is 50 nm. The binder is polyvinylidene fluoride (PVDF). A mass ratio of the porous polymer film (i.e., the porous cellulose film) to the conductive compositions is 5:1.

In some embodiments, a manner of preparing the conductive film for a zinc secondary battery includes the following operations:

1) A binder liquid was obtained by mixing the binder and a solvent, and stirring evenly the mixture at 1500 rpm. Then the conductive agent and the additive were added and stirred well at 1500 rpm to obtain the conductive paste. A dosage of the solvent used is 50 mL of the solvent per 5 g of the conductive agent. In some embodiments, the solvent is N-methylpyrrolidone.

Operation 2) and operation 3) are the same as the operation 2) and operation 3) in Embodiment 2.

Other contents (e.g., the composition of the zinc secondary batteries, etc.) are the same as in Embodiment 2.

Embodiment 5

In some embodiments, a conductive film for a zinc secondary battery includes a porous polymer film, and the porous polymer film is a porous polypropylene film. Pores of the porous polymer film are filled with conductive compositions. The conductive composition includes following components by weight: a conductive agent 5 g, an additive 0.2 g, and a binder 0.1 g. The conductive agent is conductive carbon black, the additive is a mixture of a tin powder and a tin dioxide, and a mass ratio of the tin powder to the tin dioxide is 1:1. A particle size of the conductive carbon black is 25 nm, a particle size of the tin powder is 50 nm, and a particle size of the tin dioxide is 20 nm. The binder was obtained by mixing PVDF with CMC in a mass ratio of 2:1. A mass ratio of the porous polymer film (i.e., the porous cellulose film) to the conductive compositions is 5:1.

In some embodiments, a manner of preparing the conductive film for the zinc secondary battery includes following operations:

1) A binder liquid was obtained by mixing the binder and a solvent, and stirring evenly the mixture at 1500 rpm. Then a conductive paste was obtained by mixing the conductive agent and the additive, and stirring evenly the mixture at 2000 rpm. A dosage of the solvent used was 50 mL of the solvent per 5 g of the conductive agent. In some embodiments, the solvent is the N-methylpyrrolidone;

Operation 2) and operation 3) are the same as the operation 2) and operation 3) in the Embodiment 2.

Other contents (e.g., the composition of the zinc secondary batteries, etc.) are the same as in Embodiment 2.

Embodiment 6

In some embodiments, a conductive film for a zinc secondary battery includes a porous polymer film, and the porous polymer film is the porous polypropylene film. Pores of the porous polymer film are filled with conductive compositions. The conductive composition includes following components by weight: a conductive agent 5 g, an additive 0.38 g, and a binder 0.1 g. The conductive agent is conductive carbon black, and the additive consists of a mixture of a tin powder, a tin dioxide, a bismuth powder, and an indium powder in a mass ratio of 1.5:1.5:0.5:0.3. A particle size of the conductive carbon black is 25 nm, a particle size of the tin powder is 50 nm, a particle size of the tin dioxide is 20 nm, a particle size of the bismuth powder is 50 nm, and a particle size of the indium powder is 60 nm. The binder was obtained by mixing the PVDF with the CMC in a mass ratio of 2:1. A mass ratio of the porous polymer film (i.e., the porous cellulose film) to the conductive compositions is 5:1.

Other contents (e.g., the manner of preparing the conductive film for a zinc secondary battery, the composition of the zinc secondary battery, etc.) are the same as in Embodiments 5.

Embodiment 7

In some embodiments (e.g., Embodiment 7), what is different from Embodiment 6, an additive includes a mixture of a tin powder, a tin oxide, a bismuth oxide powder, an indium powder, a lead oxide, and a cadmium oxide in a mass ratio of 1.5:1.2:0.5:0.3:0.2:0.1. A particle size of the tin powder is 50 nm, a particle size of the tin dioxide is 20 nm, a particle size of the bismuth oxide powder is 50 nm, a particle size of the indium powder is 60 nm, a particle size of the lead oxide is 100 nm, and a particle size of the cadmium oxide is 150 nm.

Other contents (e.g., the manner of preparing the conductive film for a zinc secondary battery, the composition of the zinc secondary battery, etc.) are the same as in Example 6.

Embodiment 8

In some embodiments, a conductive film for a zinc secondary battery includes a porous polymer film, and the porous polymer film is the porous polyethylene film. Pores of the porous polymer film are filled with conductive compositions. The conductive compositions include following components by weight: an electrically conductive agent 5 g, an additive 0.38 g. The conductive agent is conductive carbon black, and the additive includes a mixture of a tin powder, a tin oxide, a bismuth oxide powder, an indium powder, a lead oxide, and a cadmium oxide in a mass ratio of 1.5:1.2:0.5:0.3:0.2:0.1. A particle size of the conductive carbon black is 25 nm, and a particle size of the tin powder is 50 nm.

In some embodiments, a manner of preparing the conductive film for the zinc secondary battery includes following operations: by mixing an ultra-high molecular weight polyethylene particles (with a molecular weight of 1 million), a 4,4-thiobis(a 6-tert-butyl meso-cresol), a conductive composition, and a white oil according to a mass ratio of 80:8:15:20, the mixture was added to an extruder to heat and melt, the melt was extruded at 225° C., curtain coated and casted, and a thick sheet with a thickness of 500 μm was obtained, and then longitudinally stretched at 110° C., transversely stretched at 115° C., and a white oil was removed by extraction with dichloromethane and then washed, and the conductive film for the zinc secondary battery is then obtained.

In some embodiments, a binder is replaced with at least one of polyvinyl alcohol (PVA), sodium polyacrylate (PAAS), carboxymethyl cellulose (CMC), polyethylene oxide (PEO), polyvinylidene difluoride (PVDF), polyaniline (PAN), hydroxypropyl methyl cellulose (HPMC), and styrene (SBR).

Figure 2:
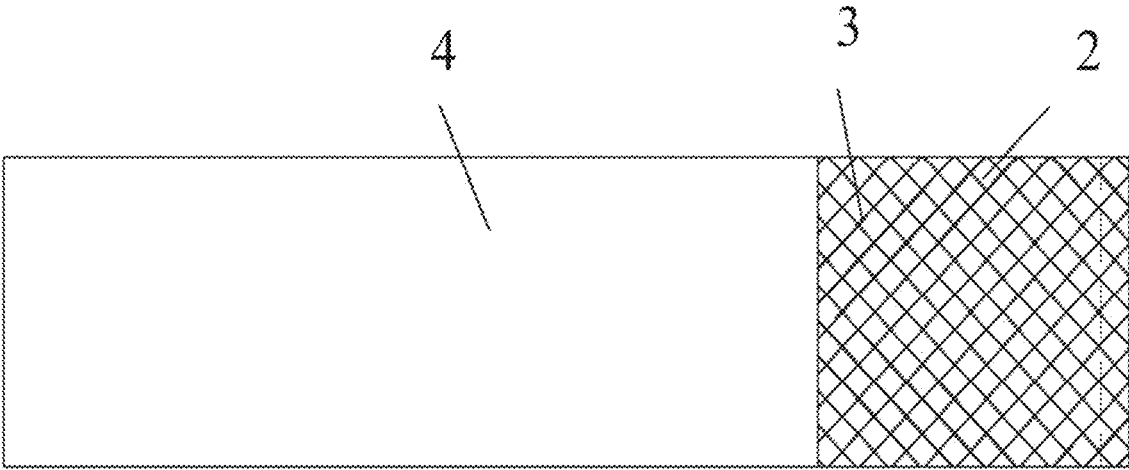
FIG. 2 is a schematic diagram of a structure of a negative electrode sheet according to some embodiments of the present disclosure.
Figure 3:
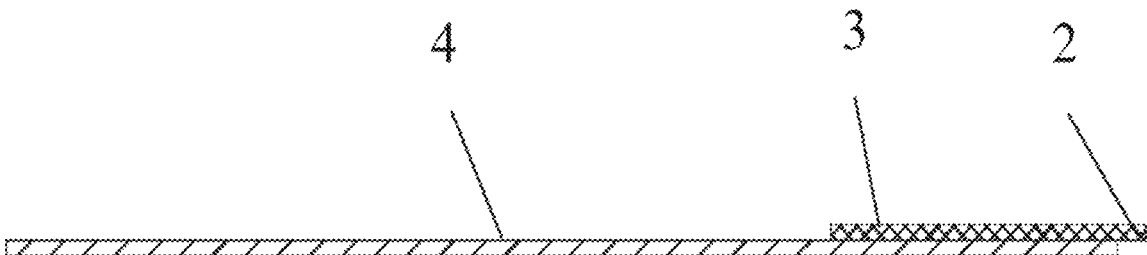
FIG. 3 is a side view of the structure of the negative electrode sheet in FIG. 2 according to some embodiments of the present disclosure.

FIG. 2 is a schematic diagram of a structure of a negative electrode sheet according to some embodiments of the present disclosure. FIG. 3 is a side view of the structure of the negative electrode sheet in FIG. 2 according to some embodiments of the present disclosure.

In some embodiments, a zinc secondary battery includes an electric core and a composite diaphragm for the zinc secondary battery wrapped around a periphery of the electric core.

The electric core is a cylindrical wound electric core or a square laminated electric core.

In some embodiments, the electric core includes a positive electrode sheet, a diaphragm, and a negative electrode sheet. The composite diaphragm for the zinc secondary battery is fitted with the negative electrode sheet.

In some embodiments, as shown in FIGS. 2 and 3, the negative electrode sheet includes an electrode sheet 4. One end of the negative electrode sheet is connected with the conductive film 2 for the zinc secondary battery in the composite diaphragm for the zinc secondary battery as described above, and one end of the conductive film 2 for the zinc secondary battery and one end of the electrode sheet 4 are laminated and melt-welded or glued to form a welding portion 3. The negative electrode sheet 4 is disposed on an outermost side of the electric core, and a length of the conductive film 2 for the zinc secondary battery is set such that the conductive film 2 for the zinc secondary battery completely wraps the electric core after winding.

In some embodiments of the present disclosure, a combination of the positive electrode sheet, the diaphragm, and the negative electrode sheet provides a favorable environment for an electrochemical reaction, which improves charging and discharging efficiency and performance of the zinc secondary battery. In addition, the composite diaphragm for the zinc secondary battery is laminated to the negative electrode sheet, which improves the efficiency of the ion transmission between the electrodes and reduces a resistance to the ion transmission.

In some embodiments of the present disclosure, the zinc secondary battery is wrapped with the composite diaphragm around the periphery of the electric core, which solves a problem that an existing conductive tinned copper foil is unable to be welded with a battery diaphragm.

Figure 4:
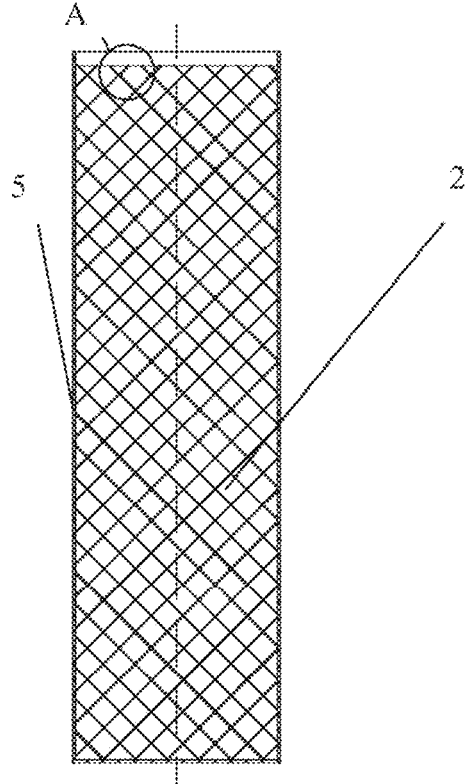
FIG. 4 is a schematic diagram illustrating a structure of a zinc secondary battery according to some embodiments of the present disclosure.
Figure 5:
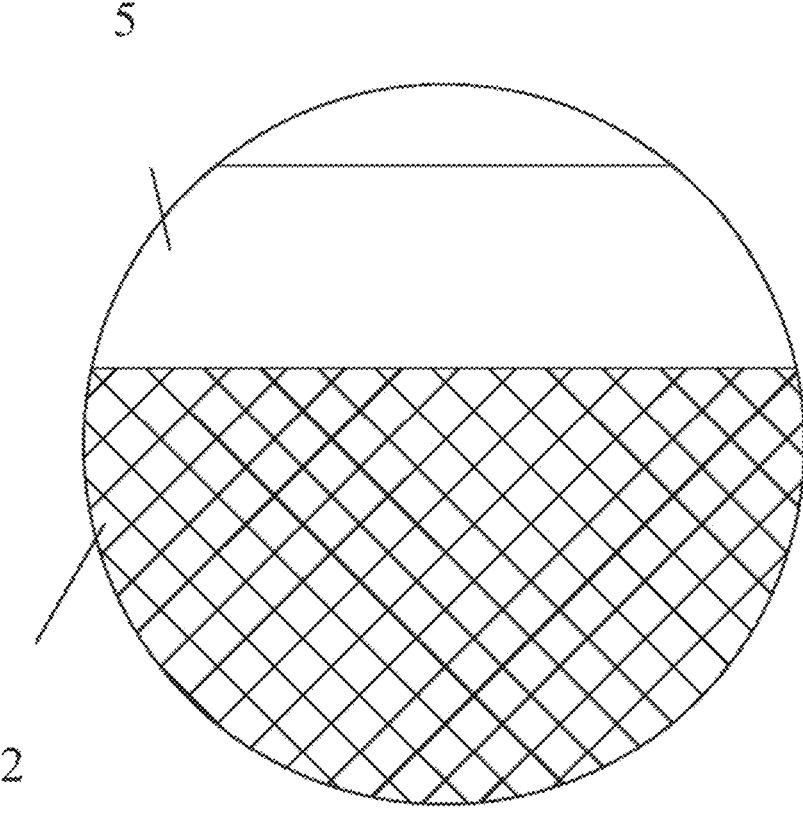
FIG. 5 is a partially enlarged view of a region A in FIG. 4 according to some embodiments of the present disclosure.
Figure 6:
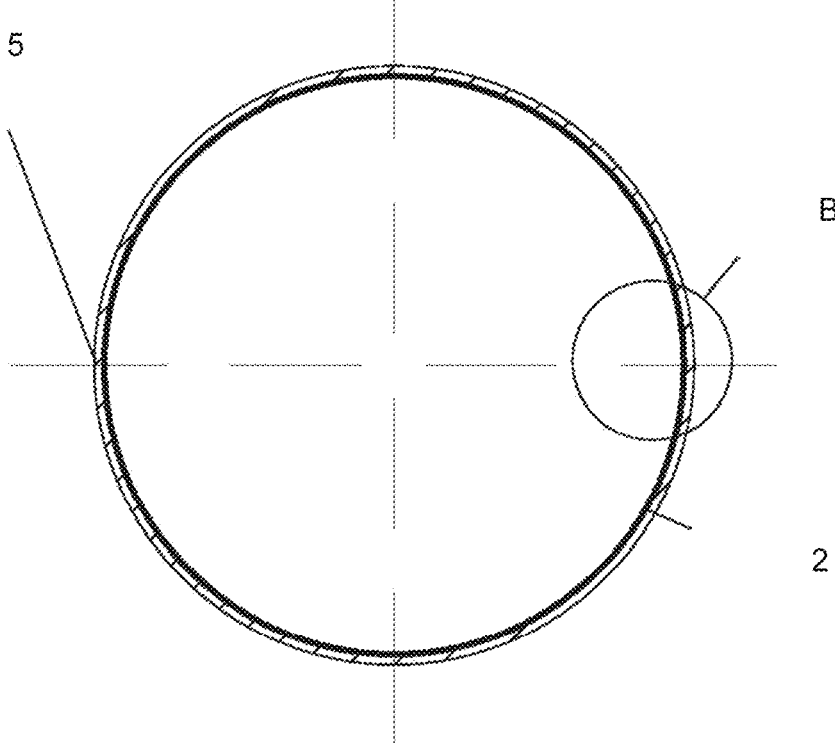
FIG. 6 is a top view of the structure of the zinc secondary battery in FIG. 4 according to some embodiments of the present disclosure.
Figure 7:
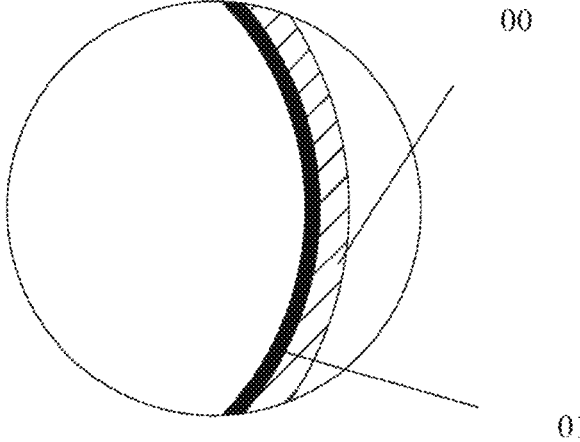
FIG. 7 is a partially enlarged view of a region B in FIG. 6 according to some embodiments of the present disclosure.

FIG. 4 is a schematic diagram illustrating a structure of a zinc secondary battery according to some embodiments of the present disclosure. FIG. 5 is a partially enlarged view of a region A in FIG. 4 according to some embodiments of the present disclosure. FIG. 6 is a top view of the structure of the zinc secondary battery in FIG. 4 according to some embodiments of the present disclosure. FIG. 7 is a partially enlarged view of a region B in FIG. 6 according to some embodiments of the present disclosure.

In some embodiments, the zinc secondary battery includes a shell and an electric core disposed in the shell. An inner wall of the shell is fitted with the composite diaphragm for the zinc secondary battery.

The shell refers to an external structure of the zinc secondary battery that accommodates and protects an internal core assembly. For example, the shell is at least one of a plastic, a metal (e.g., aluminum or steel), or other material that is strong and has a good sealing.

In some embodiments, as shown in FIGS. 4 to 7, the zinc secondary battery includes a metal shell 5 and an electric core disposed within the metal shell 5. The metal shell 5 is a cylindrical shell, and the inner wall of the metal shell 5 is disposed with the conductive film 2 for the zinc secondary battery in the composite diaphragm for the zinc secondary battery as described above.

In some embodiments of the present disclosure, the shell provides an external protection for the electric core, which prevents external physical shocks and pressures from damaging the electric core, thereby improving a stability of the zinc secondary battery.

Experimental Example (1) Tensile Test

Combining the above, the composite diaphragms for the zinc secondary batteries prepared in Embodiments 1-4 were taken for a tensile test. Test results are shown in a table below.

TABLE 1

| Comparison of test results of composite diaphragms of Embodiments 1-4 | | | | |
|---|---|---|---|---|
| Items | Embodiment 1 | Embodiment 2 | Embodiment 3 | Embodiment 4 |
| Fracture strength (longitudinal) MPa | ≥100 | ≥100 | ≥100 | ≥100 |
| Fracture strength (transverse) MPa | ≥25 | ≥25 | ≥25 | ≥25 |

From the Table 1, it can be seen that the composite diaphragms for the zinc secondary batteries prepared in the present disclosure have high fracture strength and good mechanical properties.

(2) Electrochemical Performance Test

Combining the above, cylindrical zinc-nickel batteries (AA1000 mAh battery) were prepared by taking the composite diaphragms for the zinc secondary batteries prepared in Embodiments 1-4 and wrapping the composite diaphragms around peripheries of electric cores.

Each cylindrical zinc-nickel battery was activated by 0.2 Coulombs (C) and charged by 0.2 C for 5 h. After set aside for 10 min, the cylindrical zinc-nickel battery was charged and discharged at 1 C for the test, and the test was terminated after 500 cycles. A capacity retention of the cylindrical zinc-nickel was determined.

The capacity retention refers to a ratio of a remaining capacity to an initial capacity of the battery after a certain count of charge/discharge cycles. The capacity retention is usually represented by a percentage.

TABLE 2

| Comparison of test results for zinc secondary batteries of Embodiments 1-4 | | | | |
|---|---|---|---|---|
| Count of cycles | Embodiments 1 | Embodiment 2 | Embodiment 3 | Embodiment 4 |
| First | 1003 | 1014 | 1010 | 1010 |
| 100th | 989 | 997 | 1000 | 997 |
| capacity retention | 98.6% | 98.3% | 99.0% | 98.7% |
| 200th | 967 | 971 | 977 | 973 |
| capacity retention | 96.4% | 95.8% | 96.7% | 96.3% |
| 300th | 935 | 941 | 938 | 940 |
| capacity retention | 93.2% | 92.8% | 92.9% | 93.1% |
| 400th | 902 | 898 | 904 | 906 |
| capacity retention | 89.9% | 88.6% | 89.5% | 89.7% |
| 500th | 843 | 847 | 845 | 841 |
| capacity retention | 84.1% | 83.5% | 83.7% | 83.3% |

From the Table 2, it can be seen that each of the zinc secondary batteries of the present disclosure has a good performance in a high-rate discharge cycle, and still maintains a very high capacity retention rate after 500 cycles.

The basic concepts have been described above, and it is apparent to those skilled in the art that the foregoing detailed disclosure is intended as an example only and does not constitute a limitation of the present disclosure. Although not expressly stated herein, those skilled in the art makes various modifications, improvements, and amendments to the present disclosure. Such modifications, improvements, and amendments are suggested in the present disclosure, so such modifications, improvements, and amendments remain within the spirit and scope of the exemplary embodiments of the present disclosure.

Also, the present disclosure uses specific words to describe the embodiments thereof. For example, "an embodiment," "one embodiment," and/or "a count of embodiments" means a feature, a structure, or a characteristic associated with at least one embodiment of the present disclosure. Accordingly, it should be emphasized and noted that "an embodiment," or "one embodiment," or "an alternative embodiment" referred to two or more times in different places in the present disclosure do not necessarily refer to the same embodiment. In addition, certain features, structures, or characteristics of one or more embodiments of the present disclosure are suitably combined.

Furthermore, unless expressly stated in the claims, the order of processing elements and sequences, the use of numerical letters, or the use of other names described herein are not intended to limit the order of the processes and methods of the present disclosure. Although some embodiments of the present disclosure currently considered useful are discussed in the above disclosure by way of various examples, it should be understood that such details serve only illustrative purposes and that the additional claims are not limited to the disclosed embodiments, but rather the claims are intended to cover all amendments and equivalent combinations that are consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be noted that in order to simplify the presentation of the disclosure of the present disclosure, and thereby aid in the understanding of one or more embodiments of the invention, the preceding description of embodiments of the present disclosure sometimes incorporates a variety of features into a single embodiment, accompanying drawings, or description thereof. However, this method of disclosure does not imply that the object of the present disclosure requires more features than those mentioned in the claims. Rather, claimed subject matter may lie in less than all features of a single foregoing disclosed embodiment.

Some embodiments use counts to describe the count of components, attributes, and it should be understood that such counts used in the description of the embodiments are modified in some examples by the modifiers "about," "approximately," or "generally" to describe the number of components, attributes, and properties. Unless otherwise stated, "about", "approximately" or "generally" indicates that a variation of ±20% is permitted. Accordingly, in some embodiments, the numerical parameters used in the present disclosure and the claims are approximations, which can change depending on the desired characteristics of the individual embodiment. In some embodiments, the numerical parameter should consider a specified number of valid digits and use a general place-keeping method. Although the numerical domains and parameters used to confirm the breadth of their ranges in some embodiments of the present disclosure are approximations, in specific embodiments such values are set as precisely as possible within the feasible range.

With respect to each patent, patent application, patent application disclosure, and other material, such as articles, books, manuals, publications, documents, etc., cited in the present disclosure, the entire contents thereof are hereby incorporated herein by reference. Application history documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terminology in the materials appended to the present disclosure and those described in the present disclosure, the descriptions, definitions, and/or use of terminology in the present disclosure shall prevail.

Finally, it should be understood that the embodiments described in the present disclosure are intended only to illustrate the principles of the embodiments of the present disclosure. Other deformations may also fall within the scope of the present disclosure. Thus, by way of example and not limitation, alternative configurations of embodiments of the present disclosure may be considered consistent with the teachings of the present disclosure. Accordingly, the embodiments of the present disclosure are not limited to the embodiments expressly presented and described herein.

What is claimed is:

1. A composite diaphragm for a zinc secondary battery, comprising:

a base diaphragm and a conductive film for the zinc secondary battery, the conductive film being connected to one end of the base diaphragm, wherein the conductive film for the zinc secondary battery includes a porous polymer film, a pore size of the porous polymer film is within a range of 100 nanometers (nm) to 800 nm, and pores of the porous polymer film are filled with conductive compositions, a mass ratio of the porous polymer film and the conductive compositions is 1:0.02-0.2, the conductive compositions including 1-10 parts by weight of a conductive agent and 0.1-1 part by weight of an additive; wherein the conductive agent includes at least one of graphite, conductive carbon black, acetylene black, or a graphene carbon nanotube; and the additive is formed by mixing a first additive and a second additive in a mass ratio of 1-5:0.2-3; wherein the first additive is at least one of a tin powder, a bismuth powder, an indium powder, a lead powder, and a cadmium powder, and the second additive is at least one of the tin dioxide powder, the bismuth oxide powder, an indium oxide powder, a lead oxide powder, and a cadmium oxide powder.

2. A zinc secondary battery, comprising:

an electric core and a composite diaphragm for the zinc secondary battery, wherein the composite diaphragm is wrapped around a periphery of the electric core, and the composite diaphragm includes a base diaphragm and a conductive film for the zinc secondary battery, the conductive film being connected to one end of the base diaphragm, wherein the conductive film for the zinc secondary battery includes a porous polymer film, a pore size of the porous polymer film is within a range of 100 nm to 800 nm, and pores of the porous polymer film are filled with conductive compositions, a mass ratio of the porous polymer film and the conductive compositions is 1:0.02-0.2, the conductive compositions including 1-10 parts by weight of a conductive agent and 0.1-1 part by weight of an additive; wherein the conductive agent includes at least one of graphite, conductive carbon black, acetylene black, or a graphene carbon nanotube; and the additive is formed by mixing a first additive and a second additive in a mass ratio of 1-5:0.2-3; wherein the first additive is at least one of a tin powder, a bismuth powder, an indium powder, a lead powder, and a cadmium powder, and the second additive is at least one of the tin dioxide powder, the bismuth oxide powder, an indium oxide powder, a lead oxide powder, and a cadmium oxide powder.

3. The zinc secondary battery of claim 2, wherein the electric core includes a positive electrode sheet, a diaphragm, and a negative electrode sheet, and the composite diaphragm is fitted with the negative electrode sheet.

4. A zinc secondary battery, comprising:

a shell and an electric core disposed in the shell, wherein an inner wall of the shell is fitted with a composite diaphragm for a zinc secondary battery, the composite diaphragm comprising:

a base diaphragm and a conductive film for the zinc secondary battery, the conductive film being connected to one end of the base diaphragm, wherein the conductive film for the zinc secondary battery includes a porous polymer film, a pore size of the porous polymer film is within a range of 100 nanometers (nm) to 800 nm, and pores of the porous polymer film are filled with conductive compositions, a mass ratio of the porous polymer film and the conductive compositions is 1:0.02-0.2, the conductive compositions including 1-10 parts by weight of a conductive agent and 0.1-1 part by weight of an additive; wherein the conductive agent includes at least one of graphite, conductive carbon black, acetylene black, or a graphene carbon nanotube; and the additive is formed by mixing a first additive and a second additive in a mass ratio of 1-5:0.2-3; wherein the first additive is at least one of a tin powder, a bismuth powder, an indium powder, a lead powder, and a cadmium powder, and the second additive is at least one of the tin dioxide powder, the bismuth oxide powder, an indium oxide powder, a lead oxide powder, and a cadmium oxide powder.

5. The zinc secondary battery of claim 3, wherein the negative electrode sheet includes an electrode sheet.

6. The zinc secondary battery of claim 5, wherein one end of the negative electrode sheet is connected with the conductive film for the zinc secondary battery in the composite diaphragm.

7. The zinc secondary battery of claim 5, wherein one end of the conductive film for the zinc secondary battery and one end of the electrode sheet are laminated and melt-welded or glued to form a welding portion.

8. The zinc secondary battery of claim 7, wherein the negative electrode sheet is disposed on an outermost side of the electric core.

9. The zinc secondary battery of claim 6, wherein a length of the conductive film for the zinc secondary battery is set such that the conductive film for the zinc secondary battery completely wraps the electric core after winding.

10. The composite diaphragm for the zinc secondary battery of claim 1, wherein the conductive film for the zinc secondary battery is prepared through following operations:

generating a conductive paste by mixing evenly the conductive compositions and a solvent, wherein the solvent includes at least one of water, N-methyl-2-pyrrolidone (NMP), ethylene glycol dimethyl ether, diethylene glycol dimethyl ether, a carbonate solvent, or a carboxylic acid ester; and obtaining the conductive film for the zinc secondary battery by scrapping the conductive paste onto a surface of the porous polymer film and drying the conductive paste, or, immersing the porous polymer film in the conductive paste, and taking out and drying the porous polymer film to obtain the conductive film for the zinc secondary battery.

11. The composite diaphragm for the zinc secondary battery of claim 1, wherein the conductive film for the zinc secondary battery is prepared through following operations:

mixing polymer particles, an antioxidant, the conductive compositions, and a pore-forming agent evenly;

obtaining the conductive film for the zinc secondary battery by performing an extrusion, a curtain coating, a casting, a longitudinal stretching, a transverse stretching, a pore-forming agent removing, a washing treatment on the mixture, wherein a mass ratio of the polymer particles, the antioxidant, the conductive agent, the additive, and the pore-forming agent is (70-95):(8-10):(5-15):(10-20).

12. The zinc secondary battery of claim 2, wherein the conductive film for the zinc secondary battery is prepared through following operations:

generating a conductive paste by mixing evenly the conductive compositions and a solvent, wherein the solvent includes at least one of water, N-methyl-2-pyrrolidone (NMP), ethylene glycol dimethyl ether, diethylene glycol dimethyl ether, a carbonate solvent, or a carboxylic acid ester; and obtaining the conductive film for the zinc secondary battery by scrapping the conductive paste onto a surface of the porous polymer film and drying the conductive paste, or, immersing the porous polymer film in the conductive paste, and taking out and drying the porous polymer film to obtain the conductive film for the zinc secondary battery.

13. The zinc secondary battery of claim 2, wherein the conductive film for the zinc secondary battery is prepared through following operations:

mixing polymer particles, an antioxidant, the conductive compositions, and a pore-forming agent evenly, and obtaining the conductive film for the zinc secondary battery by performing an extrusion, a curtain coating, a casting, a longitudinal stretching, a transverse stretching, a pore-forming agent removing, a washing treatment on the mixture, wherein a mass ratio of the polymer particles, the antioxidant, the conductive agent, the additive, and the pore-forming agent is (70-95):(8-10):(5-15):(10-20).

14. The zinc secondary battery of claim 2, wherein the conductive film for the zinc secondary battery is connected to the base diaphragm through a hot melt welding or an ultrasonic welding.

15. The zinc secondary battery of claim 2, wherein a thickness of the conductive film for the zinc secondary battery is within a range of 0.02 mm to 3.0 mm.

16. The composite diaphragm for the zinc secondary battery of claim 1, wherein a particle size of the additive is within a range of 10 nm to 500 nm, the particle size of the first additive is within a range of 10 nm to 100 nm, and the particle size of the second additive is within a range of 20 nm to 500 nm.

17. The zinc secondary battery of claim 2, wherein a particle size of the additive is within a range of 10 nm to 500 nm, the particle size of the first additive is within a range of 10 nm to 100 nm, and the particle size of the second additive is within a range of 20 nm to 500 nm.

\*    \*    \*    \*    \*